(12) United States Patent
Wey et al.

(10) Patent No.: US 12,618,696 B2
(45) Date of Patent: May 5, 2026

(54) SYSTEMS AND METHODS FOR UTILIZING DISTRIBUTED FIBER OPTIC SENSING TO DETECT RISKS TO FIBERS

(71) Applicant: Verizon Patent and Licensing Inc., Basking Ridge, NJ (US)

(72) Inventors: Jun Shan Wey, Sammamish, WA (US); Denis A. Khotimsky, Westborough, MA (US); Tiejun J. Xia, Richardson, TX (US); Gregory K. Sherrill, Herndon, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 53 days.

(21) Appl. No.: 18/514,952

(22) Filed: Nov. 20, 2023

(65) Prior Publication Data

US 2025/0164289 A1 May 22, 2025

(51) Int. Cl.
*G01D 5/353* (2006.01)

(52) U.S. Cl.
CPC .................................... *G01D 5/353* (2013.01)

(58) Field of Classification Search
CPC ...................................................... G01D 5/353
See application file for complete search history.

(56) References Cited

U.S. PATENT DOCUMENTS

| | | | | |
|---|---|---|---|---|
| 11,387,898 B2 * | 7/2022 | Wang | ................. | G01D 5/35358 |
| 11,898,900 B1 * | 2/2024 | Campos | ............. | G01D 5/35358 |
| 12,345,554 B2 * | 7/2025 | Huang | ............... | G01D 5/35358 |
| 2012/0230629 A1 * | 9/2012 | Hill | .................... | G01D 5/35348 |
| | | | | 385/12 |
| 2020/0200592 A1 * | 6/2020 | Huang | ................. | H04B 10/071 |
| 2021/0278314 A1 * | 9/2021 | Xia | .......................... | G01M 7/00 |
| 2022/0123835 A1 * | 4/2022 | Kaczorowski | ..... | H04B 10/2581 |
| 2022/0137595 A1 * | 5/2022 | Xia | ......................... | G01H 9/004 |
| | | | | 700/28 |
| 2023/0152130 A1 * | 5/2023 | Huang | .............. | G01D 5/35361 |
| | | | | 73/655 |

* cited by examiner

*Primary Examiner* — Michelle M Iacoletti
*Assistant Examiner* — Maher Yazback

(57) ABSTRACT

A monitoring system connected to a network may receive a request from a user device over the network to monitor a fiber cable. A fiber sensing device may connect to the monitoring system, may communicate messages with the monitoring system, and may connect to the fiber cable. The fiber sensing device may receive an instruction from the monitoring system to begin a monitoring function for the fiber cable, and may provide a first optical signal to the fiber cable. The fiber sensing device may receive, from the fiber cable, a second optical signal, based on the first optical signal, and may detect a risk to the fiber cable based on the second optical signal. The fiber sensing device may send an alert about the risk to the fiber cable to the monitoring system, and the monitoring system may send the alert over the network to the user device.

20 Claims, 11 Drawing Sheets

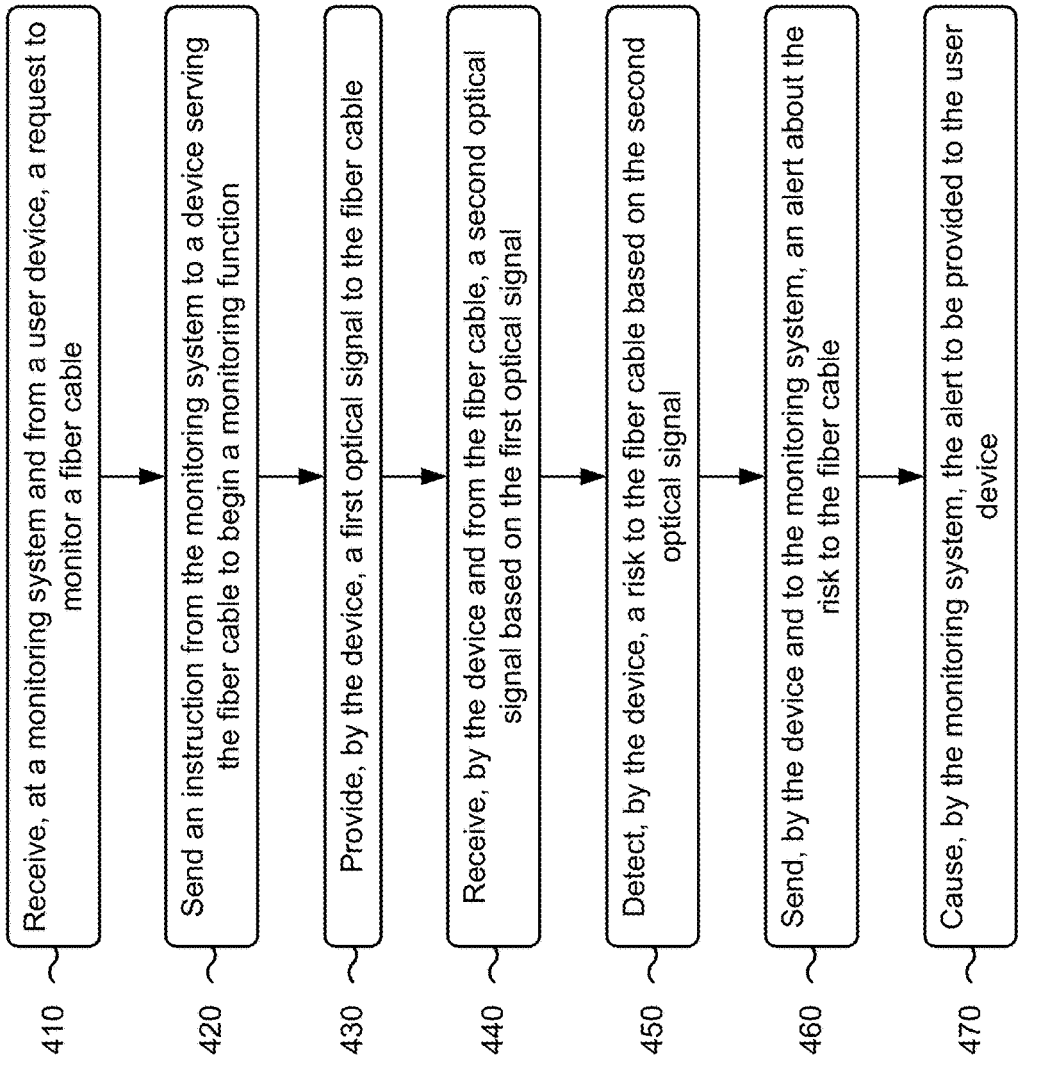

410 — Receive, at a monitoring system and from a user device, a request to monitor a fiber cable 420 — Send an instruction from the monitoring system to a device serving the fiber cable to begin a monitoring function 430 — Provide, by the device, a first optical signal to the fiber cable 440 — Receive, by the device and from the fiber cable, a second optical signal based on the first optical signal 450 — Detect, by the device, a risk to the fiber cable based on the second optical signal 460 — Send, by the device and to the monitoring system, an alert about the risk to the fiber cable 470 — Cause, by the monitoring system, the alert to be provided to the user device

SYSTEMS AND METHODS FOR UTILIZING DISTRIBUTED FIBER OPTIC SENSING TO DETECT RISKS TO FIBERS

BACKGROUND

Distributed fiber optic sensing (DFOS) has recently been introduced into the telecommunications industry. DFOS allows optical fiber to support new services, such as determination of cable locations, cable cut prevention, perimeter intrusion detection, and other sensing-based services.

BRIEF DESCRIPTION OF THE DRAWINGS

FIG. 4 is a flowchart of an example process for utilizing distributed fiber optic sensing to detect risks to fibers.

DETAILED DESCRIPTION OF EXAMPLE EMBODIMENTS

Figure 1A:
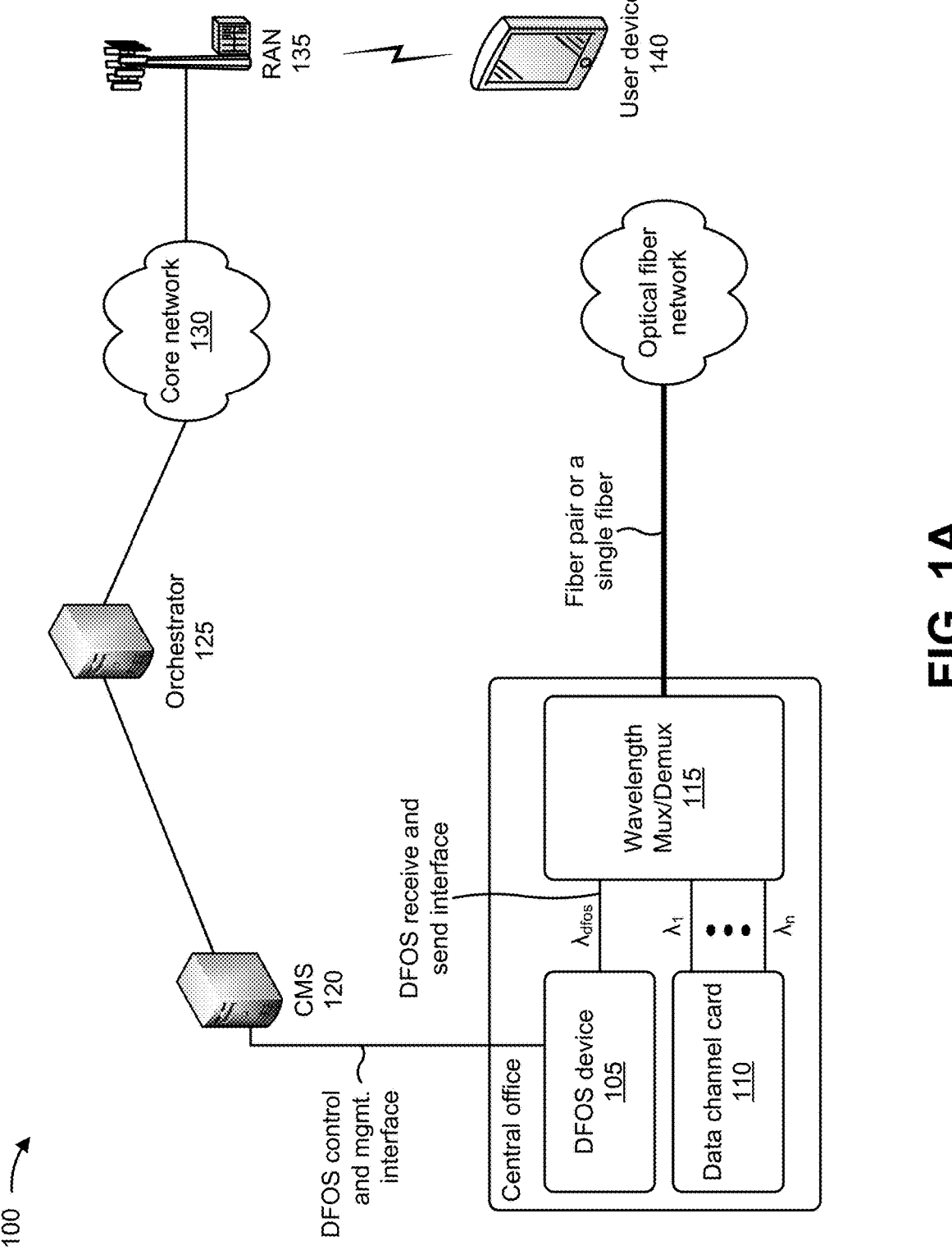
FIGS. 1A-1H are diagrams of an example associated with utilizing distributed fiber optic sensing to detect risks to fibers.

The following detailed description of example implementations refers to the accompanying drawings. The same reference numbers in different drawings may identify the same or similar elements.

By leveraging a relative phase shift of a reflectance of Rayleigh, Brillouin, and Raman scattering of a light wave, an ambient environmental vibration, acoustic effects, temperature, and fiber/cable strain can be detected with DFOS. Current techniques utilize a DFOS system with an optical fiber network. However, when a risk to a fiber cable is detected by the DFOS system, the DFOS system is unable to provide notice of the risk to devices associated with other networks (e.g., a user device associated with a radio access network (RAN) and a core network). Furthermore, the devices associated with the other networks are unable to request that the DFOS system monitor a fiber cable. Thus, current techniques for monitoring fiber network cables consume computing resources (e.g., processing resources, memory resources, communication resources, and/or the like), networking resources, and/or other resources associated with failing to notify devices associated with other network about DFOS detected risks to fiber cables, failing to enable the devices associated with the other networks to request DFOS monitoring of fiber cables, failing to support new services, such as determination of cable locations, cable cut prevention, perimeter intrusion detection, and/or other sensing-based services for fibers, and/or the like.

Some implementations described herein relate to utilizing distributed fiber optic sensing to detect risks to fibers. For example, a monitoring system connected to a network may receive a request from a user device over the network to monitor a fiber cable. A fiber sensing device (e.g., a DFOS device) may connect to the monitoring system, may communicate messages with the monitoring system, and may connect to the fiber cable. The fiber sensing device may receive an instruction from the monitoring system to begin a monitoring function for the fiber cable, and may provide a first optical signal to the fiber cable. The fiber sensing device may receive, from the fiber cable, a second optical signal, based on the first optical signal, and may detect a risk to the fiber cable based on the second optical signal. The fiber sensing device may send an alert about the risk to the fiber cable to the monitoring system, and the monitoring system may send the alert over the network to the user device.

In this way, the sensor device utilizes distributed fiber optic sensing to detect risks to fibers. For example, when a risk to a fiber cable is detected by the sensor device, the sensor device may provide notice of the risk to devices associated with other networks (e.g., a user device associated with a RAN and a core network). Furthermore, the devices associated with the other networks may request that the sensor device monitor a fiber cable. Thus, the sensor device may conserve computing resources, networking resources, and/or other resources that would have otherwise been consumed by failing to notify devices associated with other network about DFOS detected risks to fiber cables, failing to enable the devices associated with the other networks to request DFOS monitoring of fiber cables, failing to support new services, such as determination of cable locations, cable cut prevention, perimeter intrusion detection, and/or other sensing-based services for fibers, and/or the like.

FIGS. 1A-1H are diagrams of an example 100 associated with utilizing distributed fiber optic sensing to detect risks to fibers. As shown in FIGS. 1A-1H, example 100 includes a central office with a DFOS device 105, a data channel card 110, and a wavelength multiplexer/demultiplexer 115. The central office may be associated with an optical fiber network, a control and management system (CMS) 120, an orchestrator 125, a core network 130, a radio access network (RAN) 135, and a user device 140. Further details of the central office, the DFOS device 105, the data channel card 110, the wavelength multiplexer/demultiplexer 115, the optical fiber network, the CMS 120, the orchestrator 125, the core network 130, the RAN 135, and the user device 140 are provided elsewhere herein.

As shown in FIG. 1A, the DFOS device 105 may connect to the wavelength multiplexer/demultiplexer 115 via an interface to send or receive a signal, and may connect to the CMS 120 via a control and management interface. The DFOS device 105 may utilize the send/receive interface to send a signal to be sent at a wavelength ($\lambda_{dfos}$) to the wavelength multiplexer/demultiplexer 115 or to receive the signal received at the same wavelength ($\lambda_{dfos}$) from the wavelength multiplexer/demultiplexer 115. The data channel card may process data traffic associated with multiple data channels to be sent using different wavelengths ($\lambda_1, \ldots, \lambda_n$) to the wavelength multiplexer/demultiplexer 115 or to receive data traffic associated with the data channels using the different wavelengths ($\lambda_1, \ldots, \lambda_n$) from the wavelength multiplexer/demultiplexer 115. Depending on whether the system is operated using in-band or out-of-band transmission, wavelength $\lambda_{dfos}$ may be included in the wavelengths $\lambda_1, \ldots, \lambda_n$ (in-band) or may be separate from the wavelengths $\lambda_1, \ldots, \lambda_n$ (out-of-band).

The wavelength multiplexer/demultiplexer 115 may connect to the optical fiber network via a fiber pair or a single fiber. The fiber pair or the single fiber may be a fiber optic cable used to carry optical communications traffic in the form of optical signals. The fiber pair or the single fiber may be deployed in a route from an origin location (e.g., a central office, a point of presence, or an optical line terminal) to a destination location (e.g., a different central office, another point of presence, or another optical line terminal). The fiber pair or the single fiber may be deployed underground or above ground (e.g., using poles or other vertical stanchions). The fiber pair or the single fiber may have various small deviations from its deployment route (e.g., to avoid obstacles or comply with property rights), and may include sections that are spooled into "slack" to enable future repairs or improvements. The fiber pair or the single fiber may be a "live" fiber in the sense that is carries actual data traffic, for example as provided by the wavelength multiplexer/demultiplexer 115 via the multiple data channels.

The CMS 120 may include one or more server devices or cloud-based devices that control operation of the central office, the DFOS device 105, the data channel card 110, the wavelength multiplexer/demultiplexer 115, and/or the like. The orchestrator 125 may include one or more server devices or cloud-based devices that control multiple CMSs 120 and communicate with the core network 130. The core network 130 may include an example architecture of a fifth generation (5G) core network included in a 5G wireless telecommunications system. The RAN 135 may include one or more devices that support, for example, a cellular radio access technology (RAT). The user device 140 may include a mobile phone, a laptop computer, a tablet computer, and/or the like. The user device 140 may wirelessly connect with the RAN 135, and the RAN 135 may connect the user device 140 with the core network 130.

Figure 1B:
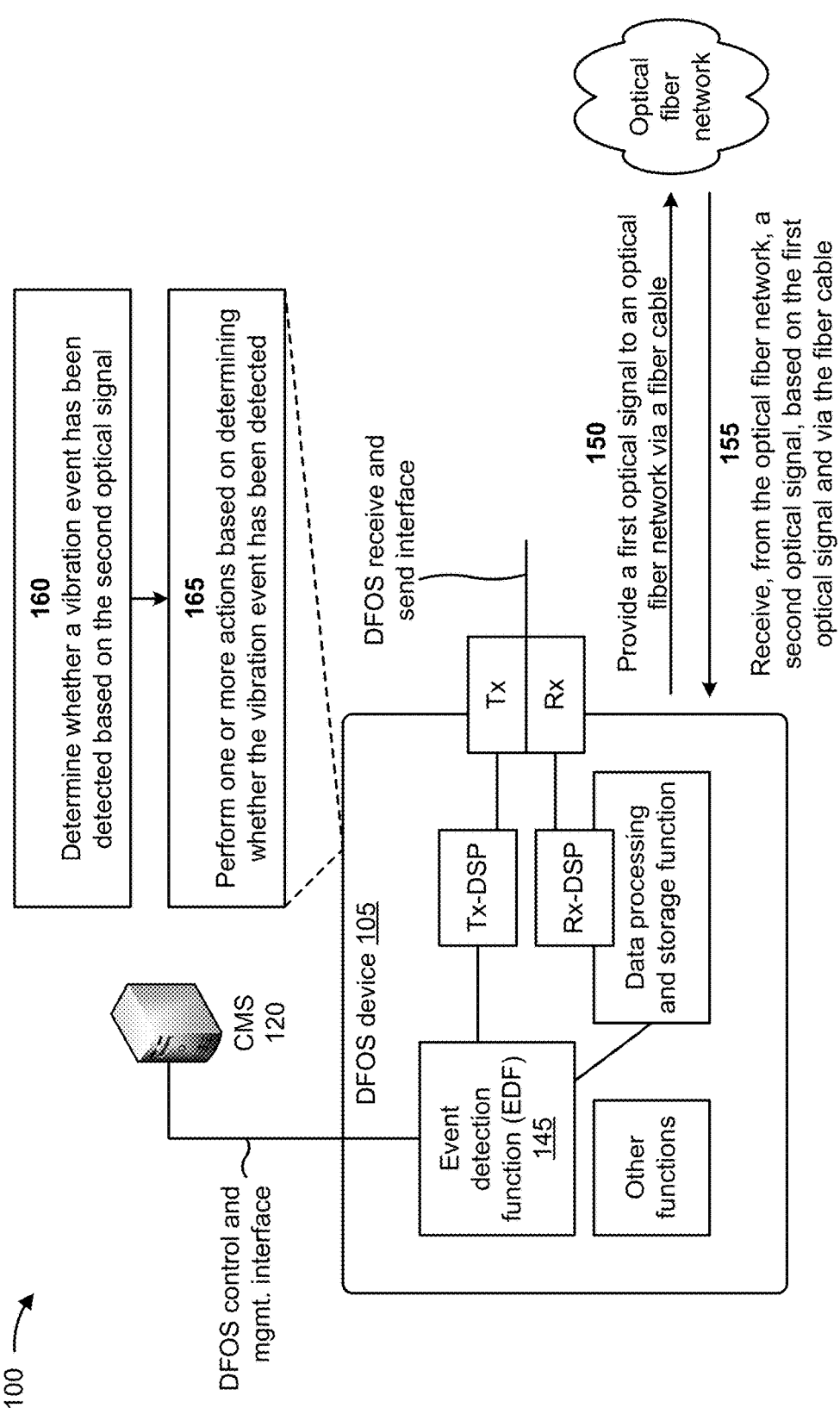

As shown in FIG. 1B, the DFOS device 105 may include an event detection function (EDF) 145 (e.g., a risk assessment function), a transmission (Tx)-digital signal processor (DSP), a receive (Rx)-DSP, a combined Tx/Rx port, a data processing and storage function, and other functions. The EDF 145 may communicate with the CMS 120 via the DFOS control and management interface. The Tx-DSP may receive sensing signals that have been digitized (e.g., and are to be transmitted) and may mathematically manipulate the signals. The Tx-DSP may perform mathematical functions, such as addition, subtraction, multiplication, and division very quickly. The Rx-DSP may receive optical signals from the optical fiber network, and may mathematically manipulate the signals. The Rx-DSP may perform mathematical functions, such as addition, subtraction, multiplication, and division very quickly. The Rx-DSP may detect different types of backscattering signals (e.g., Rayleigh, Brillouin, and/or Raman) and may determine backscattered power levels, wavelengths, time delays, phase, polarization, and/or the like for the signals. The combined Tx/Rx port may provide communication between the DFOS receive and send interface and the fiber pair or the single fiber. The other functions may include, for example, a laser pulse generator that generates an optical signal, a signal detection and processing component, an optical circulator, and/or the like. Further details of the EDF 145, the Tx-DSP, the Rx-DSP, the combined Tx/Rx port, the data processing and storage function, and the other functions are provided elsewhere herein.

As further shown in FIG. 1B, and by reference number 150, the DFOS device 105 may provide a first optical signal to the optical fiber network via the fiber cable. For example, the DFOS device 105 may include a laser pulse generator that generates a first optical signal (e.g., a transmission signal) destined for the optical fiber network. The DFOS device 105 may provide the first optical signal to the fiber cable.

As further shown in FIG. 1B, and by reference number 155, the DFOS device 105 may receive, from the optical fiber network, a second optical signal, based on the first optical signal and via the fiber cable. For example, once the first optical signal reaches a location in the optical fiber network, the first optical signal may be (at least partially) reflected back to the DFOS device 105 as the second optical signal. The fiber cable may provide the second optical signal to the DFOS device 105.

As further shown in FIG. 1B, and by reference number 160, the DFOS device 105 may determine whether a vibration event has been detected based on the second optical signal. For example, the DFOS device 105 may determine whether a vibration event associated with the live fiber cable has been detected based on the second optical signal. The DFOS device 105 may include a signal detection and processing component, such as the EDF 145, the Rx-DSP, the data processing and storage function, a distributed fiber optic sensing device (e.g., a Rayleigh scattering based distributed fiber optic acoustic sensing device), an optical reflectometry device (e.g., an optical time-domain reflectometry (OTDR) device), a computer, and/or the like. The DFOS device 105 may detect (using the signal detection and processing component) the second optical signal reflected back from the optical fiber network to the DFOS device 105, and may correlate and compare the second optical signal and the first optical signal. The DFOS device 105 may determine whether a vibration event is detected based on correlating comparing the second optical signal and the first optical signal. For example, if the second optical signal is different compared to the first optical signal, the DFOS device 105 may determine that an event (e.g., a vibration event) has occurred with the live fiber cable.

As further shown in FIG. 1B, and by reference number 165, the DFOS device 105 may perform one or more actions based on determining whether a vibration event has been detected. For example, when performing the one or more actions, the DFOS device 105 may identify a location of the detected vibration event associated with the fiber cable and may provide an alert associated with the location of the vibration event. In another example, when performing the one or more actions, the DFOS device 105 may identify a vibration event associated with the fiber cable, and may provide an alert associated with the vibration event.

Figure 1C:
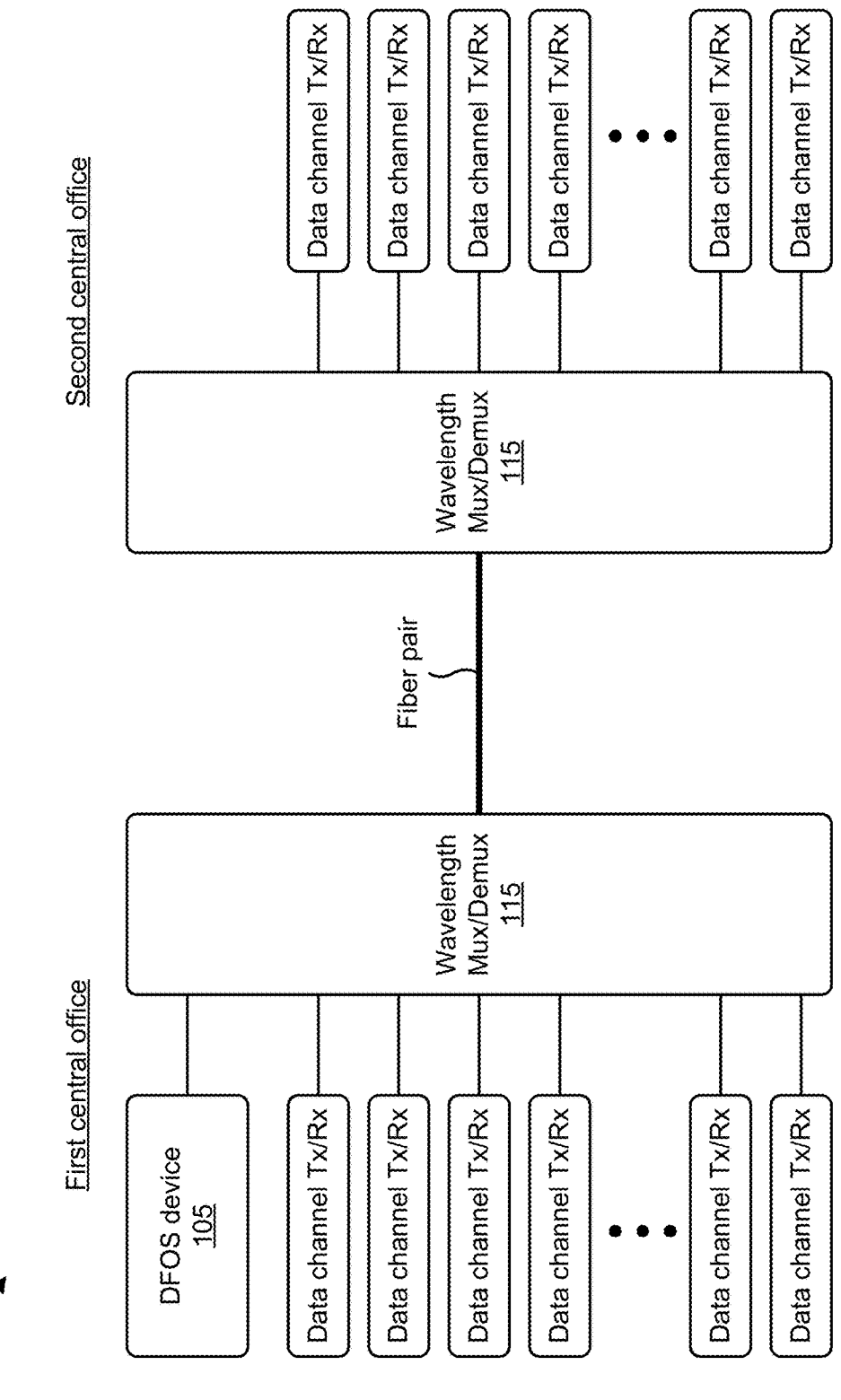

FIG. 1C depicts example components of two connected central offices (e.g., a first central office and a second central office). As shown, the first central office may include the DFOS device 105, a plurality of Tx/Rx data channels, and the wavelength multiplexer/demultiplexer 115. The plurality of Tx/Rx data channels may be provided by the data channel card 110 depicted in FIG. 1A. The second central office may include another plurality of Tx/Rx data channels and the wavelength multiplexer/demultiplexer 115. The DFOS device 105 and the plurality of Tx/Rx data channels may connect to the wavelength multiplexer/demultiplexer 115 of the first central office. The other plurality of Tx/Rx data channels may connect to the wavelength multiplexer/demultiplexer 115 of the second central office. The wavelength multiplexer/demultiplexer 115 of the first central office may connect to the wavelength multiplexer/demultiplexer 115 of the second central office via the fiber cable (e.g., a fiber pair).

Figure 1D:
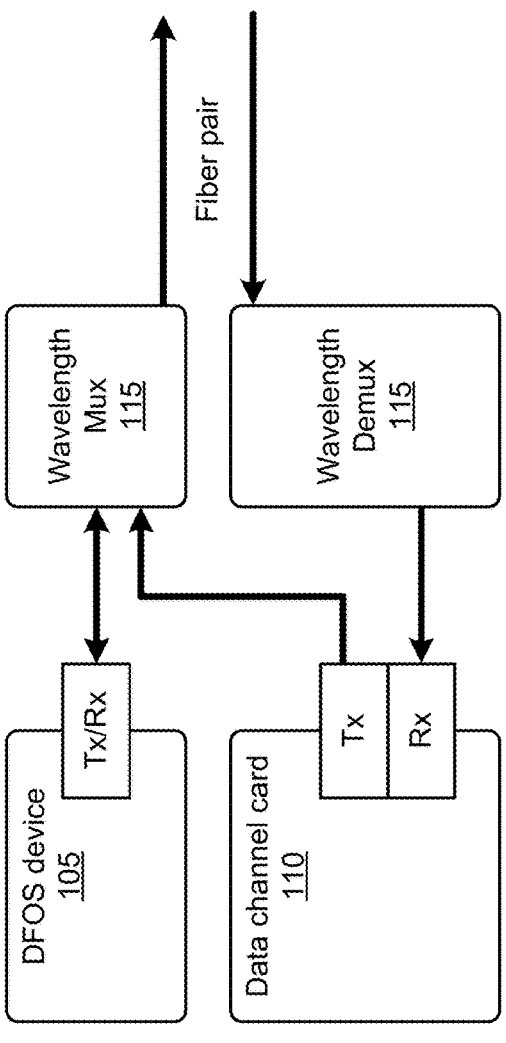
Figure 1E:
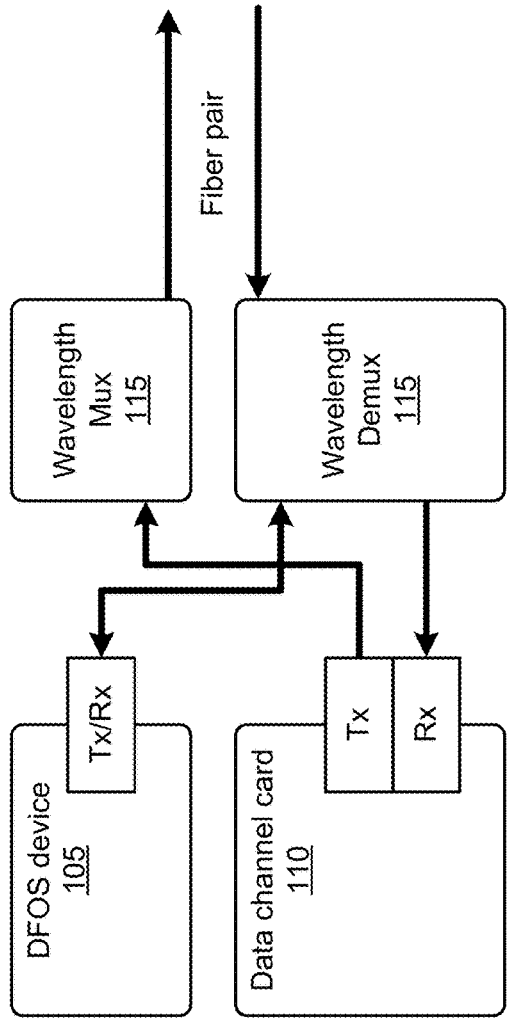
Figure 1F:
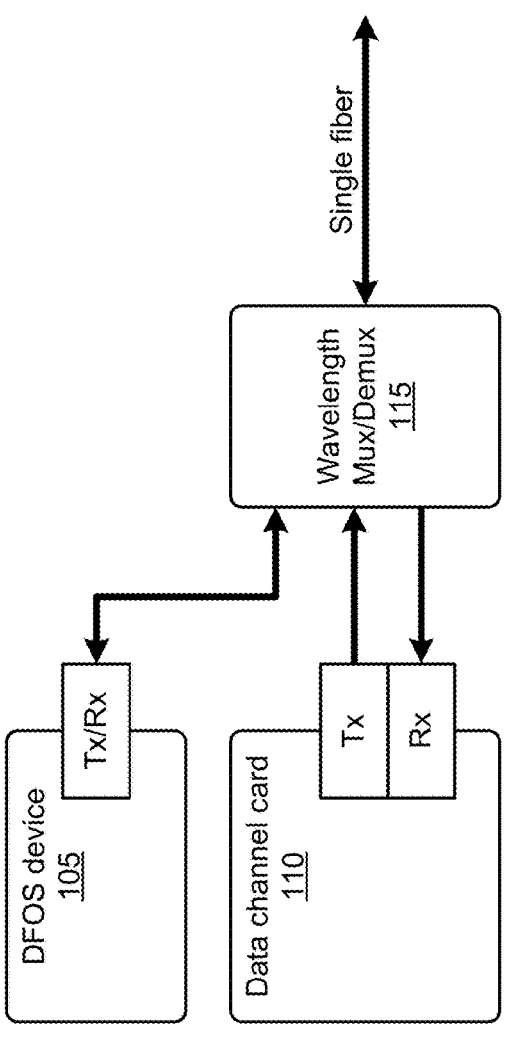

FIGS. 1D-1F show different example central office configurations, depending on whether the system is being operated using a fiber pair of separate send and receive fibers (e.g., simplex transmission) or combined send/receive over a single fiber (e.g., duplex transmission). FIG. 1D depicts an example configuration of the central office using simplex transmissions. As shown, the central office may include the DFOS device 105 and the data channel card 110. The wavelength multiplexer/demultiplexer 115 may be divided into a wavelength multiplexer 115 and a wavelength demultiplexer 115. The DFOS device 105 may include the combined Tx/Rx port and the data channel card 110 may include a Tx port and an Rx port. The wavelength multiplexer 115 may transmit signals via a first live fiber of the fiber pair, and the wavelength demultiplexer 115 may receive signals from a second live fiber of the fiber pair. The wavelength multiplexer 115 may receive signals from the combined Tx/Rx port of the DFOS device 105 to send over the first live fiber. The wavelength multiplexer 115 may receive signals from the Tx port of the data channel card 110 to send over the first live fiber. The wavelength demultiplexer 115 may transmit signals it receives to the Rx port of the data channel card 110. Because the system is detecting reflections of the signals sent by the DFOS device 105 into the first live fiber, the wavelength multiplexer 115 is configured to provide signals received on the first live fiber to the combined Tx/Rx port of the DFOS device 105.

FIG. 1E depicts another example configuration of the central office using simplex transmissions. As shown, the central office may include the DFOS device 105, the data channel card 110, the wavelength multiplexer 115, and the wavelength demultiplexer 115. The DFOS device 105 may include the combined Tx/Rx port and the data channel card 110 may include the Tx port and then Rx port. The wavelength multiplexer 115 may transmit signals via a first fiber of the fiber pair, and the wavelength demultiplexer 115 may receive signals from a second fiber of the fiber pair. The wavelength multiplexer 115 may receive signals from the Tx port of the data channel card 110 to send over the first live fiber. The wavelength demultiplexer 115 may transmit signals to the combined Tx/Rx port of the DFOS device 105 and may transmit signals to the Rx port of the data channel card 110. Because the system is detecting reflections of the signals sent by the DFOS device 105, the wavelength demultiplexer 115 is configured to allow DFOS device 105 to provide signals from its Tx/Rx port to the demultiplexer for transmission over the second live fiber.

FIG. 1F depicts still another example configuration of the central office. As shown, the central office may include the DFOS device 105, the data channel card 110, and the wavelength multiplexer/demultiplexer 115. The DFOS device 105 may include the combined Tx/Rx port and the data channel card 110 may include the Tx port and then Rx port. The wavelength multiplexer/demultiplexer 115 may transmit signals via a single fiber, and the wavelength demultiplexer 115 may receive signals from the single fiber. The wavelength multiplexer/demultiplexer 115 may transmit signals to the combined Tx/Rx port of the DFOS device 105 and may receive signals from the combined Tx/Rx port of the DFOS device 105. The wavelength multiplexer/demultiplexer may receive signals from the Tx port of the data channel card 110 and may transmit signals to the Rx port of the data channel card 110.

Figure 1G:
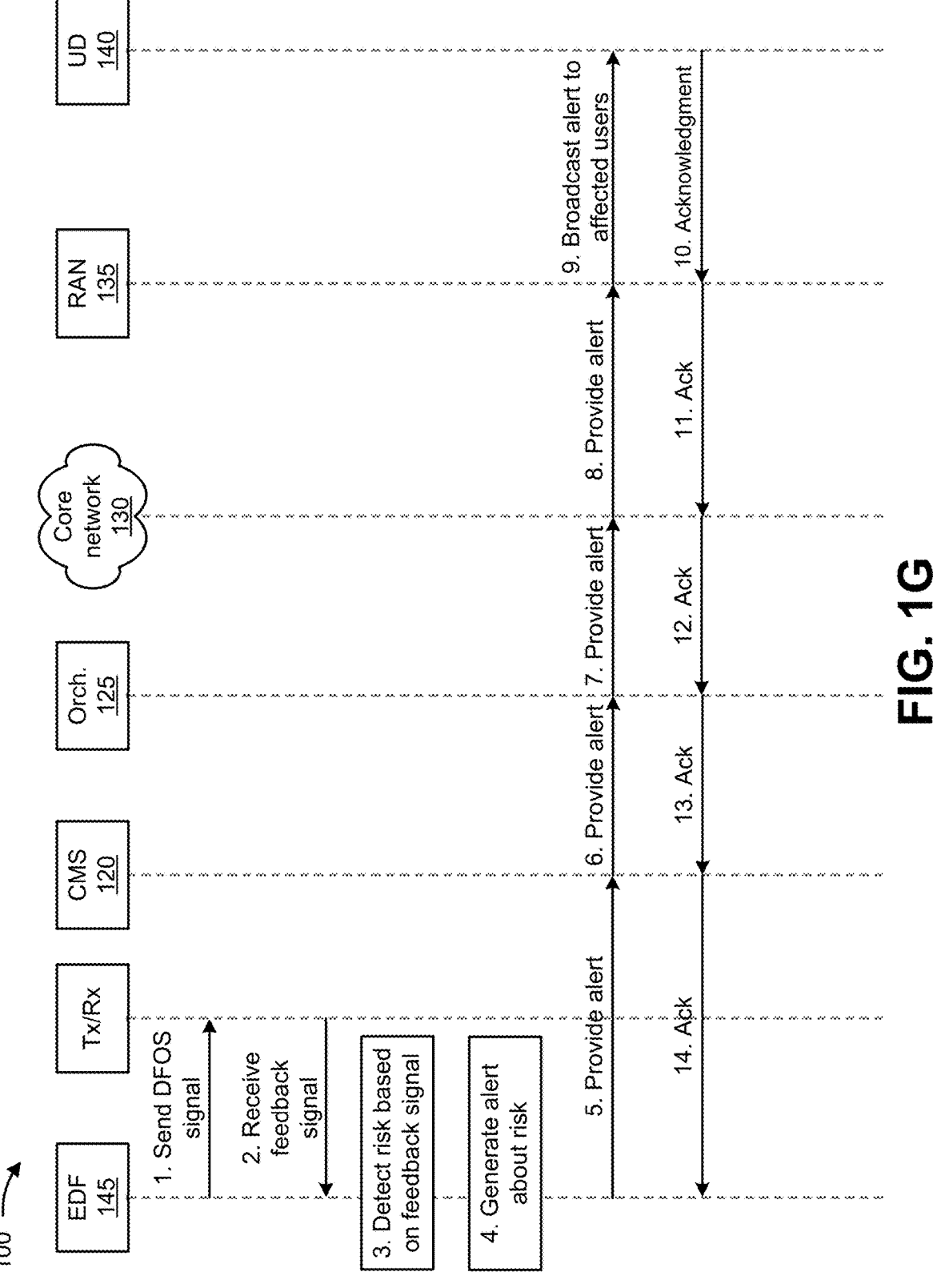

FIG. 1G is a signaling diagram depicting the DFOS device 105 providing an indication of a risk to a fiber cable to other devices associate with other networks. As shown at step 1, the EDF 145 of the DFOS device 105 may send a DFOS signal to the optical fiber network via the combined Tx/Rx port of the DFOS device 105. For example, the EDF 145 may cause Tx-DSP of the DFOS device 105 to generate the DFOS signal and to provide the DFOS signal to the optical fiber network via the combined Tx/Rx port. As shown at step 2, the EDF 145 may receive a feedback signal from the optical fiber network via the combined Tx/Rx port. For example, the optical fiber network may generate the feedback signal based on the DFOS signal, and may provide the feedback signal to the combined Tx/Rx port. The EDF 145 may receive the feedback signal from the combined Tx/Rx port. As shown at step 3, the EDF 145 may detect a risk to a fiber cable based on the feedback signal. For example, the properties of the feedback signal may provide an indication of the fiber cable at risk and the EDF 145 may detect the risk to the fiber cable based on the properties of the feedback signal. As shown at step 4, the EDF 145 may generate an alert about the risk (e.g., identifying the fiber cable and the risk).

As shown at step 5, the EDF 145 may provide the alert to the CMS 120 via the DFOS control and management interface. The CMS 120 may receive the alert from the EDF 145. As shown at step 6, the CMS 120 may provide the alert to the orchestrator 125 via one of a wired network, a wireless network, a cloud-based network, and/or the like. The orchestrator 125 may receive the alert from the CMS 120. As shown at step 7, the orchestrator 125 may provide the alert to the core network 130 via one of a wired network, a wireless network, a cloud-based network, and/or the like. The core network 130 may receive the alert from the orchestrator 125. As shown at step 8, the core network 130 may provide the alert to the RAN 135 via a backhaul network connecting the core network 130 and the RAN 135. The RAN 135 may receive the alert from the core network 130. As shown at step 9, the RAN 135 may wirelessly broadcast the alert to affected users (e.g., via user devices 140 associated with the users). The user devices 140 may receive the broadcast alert from the RAN 135. The users may cause the user devices 140 to generate an acknowledgment of the alert (e.g., acknowledging receipt of the alert).

As shown at step 10, the user device 140 may wirelessly transmit the acknowledgment to the RAN 135. The RAN 135 may receive the acknowledgment from the user device 140. As shown at step 11, the RAN 135 may provide the acknowledgment to the core network 130 via the backhaul network. The core network 130 may receive the acknowledgment from the RAN 135. As shown at step 12, the core network 130 may provide the acknowledgment to the orchestrator 125 via one of the wired network, the wireless network, the cloud-based network, and/or the like. The orchestrator 125 may receive the acknowledgment from the core network 130. As shown at step 13, the orchestrator 125 may provide the acknowledgment to the CMS 120 via one of the wired network, the wireless network, the cloud-based network, and/or the like. The CMS 120 may receive the acknowledgment from the orchestrator 125. As shown at step 14, the CMS 120 may provide the acknowledgment to the EDF 145 via the DFOS control and management interface. The EDF 145 may receive the acknowledgment from the CMS 120.

Figure 1H:
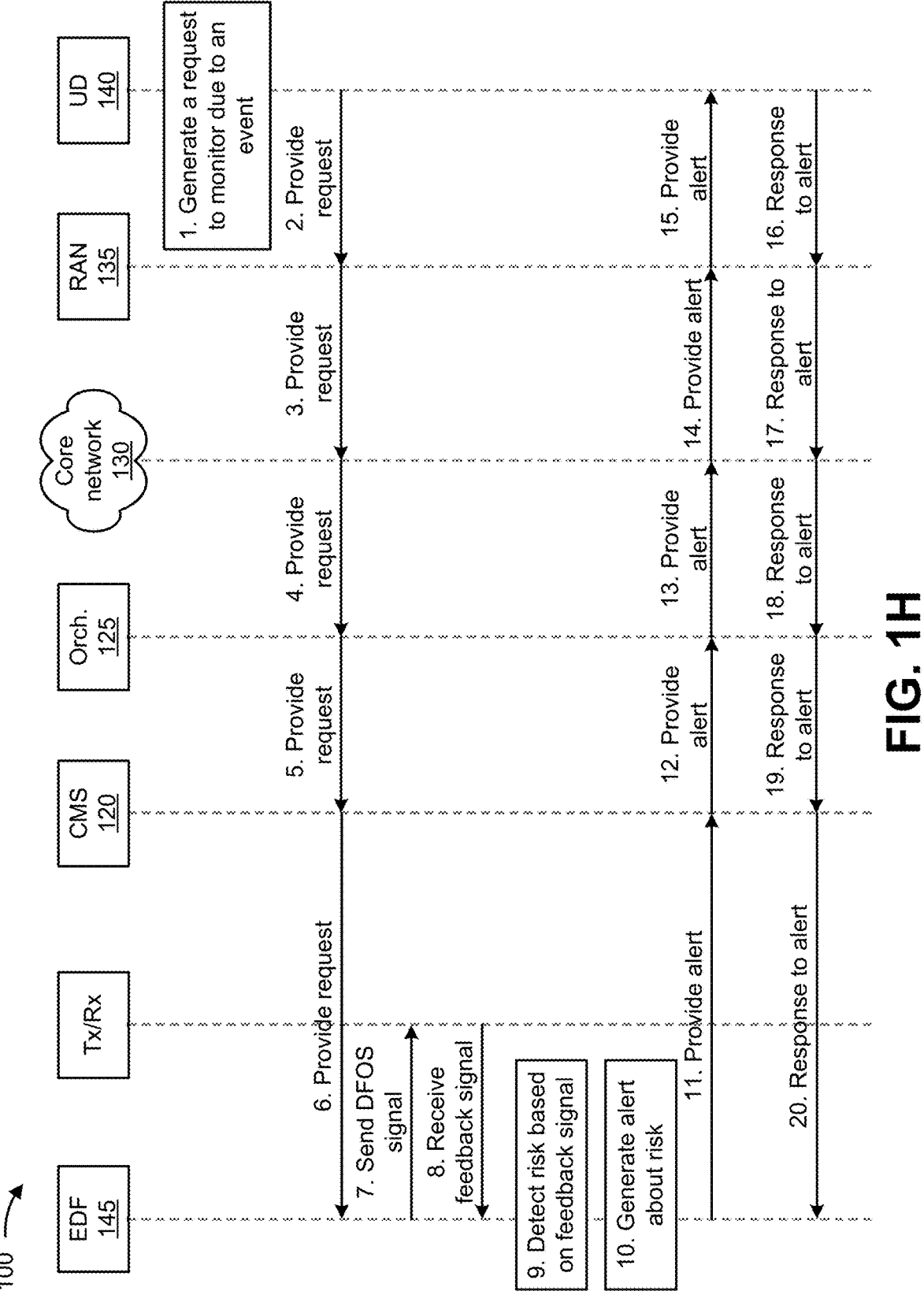

FIG. 1H is a signaling diagram depicting a request to monitor a fiber cable due to an event (e.g., construction, a natural disaster, and/or the like). As shown, a user (e.g., a field engineer or a resident affected by an event) associated with the user device 140 may become aware of an event. As shown at step 1, the field engineer may cause the user device 140 to generate a request to monitor a fiber cable due to an event. For example, the field engineer may input the request into the user device 140. As shown at step 2, the user device 140 may provide the request to the RAN 135. For example, the user device 140 may wirelessly connect to the RAN 135 and may wirelessly transmit the request to the RAN 135. The RAN 135 may receive the request from the user device 140. As shown at step 3, the RAN 135 may provide the request to the core network 130. For example, the RAN 135 may connect to the core network 130 via a backhaul network and may provide the request to the core network 130 via the backhaul network. The core network 130 may receive the request from the RAN 135.

As shown at step 4, the core network 130 may provide the request to the orchestrator 125. For example, the core network 130 may connect to the orchestrator 125 via a wired network, a wireless network, a cloud-based network, and/or the like. The core network 130 may provide the request to the orchestrator 125 via one of the wired network, the wireless network, the cloud-based network, and/or the like. The orchestrator 125 may receive the request from the core network 130. As shown at step 5, the orchestrator 125 may provide the request to the CMS 120. For example, the orchestrator 125 may connect to the CMS 120 via a wired network, a wireless network, a cloud-based network, and/or the like. The orchestrator 125 may provide the request to the CMS 120 via one of the wired network, the wireless network, the cloud-based network, and/or the like. The CMS 120 may receive the request from the orchestrator 125. As shown at step 6, the CMS 120 may provide the request to the EDF 145 of the DFOS device 105. The CMS 120 may connect to the EDF 145 via the DFOS control and management interface and may provide the request to the EDF 145 via the DFOS control and management interface. The EDF 145 may receive the request from the CMS 120.

As shown at step 7, the EDF 145 may send a DFOS signal to the optical fiber network via the combined Tx/Rx port of the DFOS device 105. For example, the EDF 145 may cause Tx-DSP of the DFOS device 105 to generate the DFOS signal and to provide the DFOS signal to the optical fiber network via the combined Tx/Rx port. As shown at step 8, the EDF 145 may receive a feedback signal from the optical fiber network via the combined Tx/Rx port. For example, the optical fiber network may generate the feedback signal based on the DFOS signal, and may provide the feedback signal to the combined Tx/Rx port. The EDF 145 may receive the feedback signal from the combined Tx/Rx port. As shown at step 9, the EDF 145 may detect a risk to a fiber cable based on the feedback signal. For example, the properties of the feedback signal may provide an indication of the fiber cable at risk and the EDF 145 may detect the risk to the fiber cable based on the properties of the feedback signal. As shown at step 10, the EDF 145 may generate an alert about the risk (e.g., identifying the fiber cable and the risk).

As shown at step 11, the EDF 145 may provide the alert to the CMS 120 via the DFOS control and management interface. The CMS 120 may receive the alert from the EDF 145. As shown at step 12, the CMS 120 may provide the alert to the orchestrator 125 via one of the wired network, the wireless network, the cloud-based network, and/or the like. The orchestrator 125 may receive the alert from the CMS 120. As shown at step 13, the orchestrator 125 may provide the alert to the core network 130 via one of the wired network, the wireless network, the cloud-based network, and/or the like. The core network 130 may receive the alert from the orchestrator 125. As shown at step 14, the core network 130 may provide the alert to the RAN 135 via the backhaul network. The RAN 135 may receive the alert from the core network 130. As shown at step 15, the RAN 135 may wirelessly transmit the alert to the user device 140. The user device 140 may receive the alert from the RAN 135. The field engineer may cause the user device 140 to generate a response to the alert (e.g., acknowledging receipt of the alert).

As shown at step 16, the user device 140 may wirelessly transmit the response to the alert to the RAN 135. The RAN 135 may receive the response to the alert from the user device 140. As shown at step 17, the RAN 135 may provide the response to the alert to the core network 130 via the backhaul network. The core network 130 may receive the response to the alert from the RAN 135. As shown at step 18, the core network 130 may provide the response to the alert to the orchestrator 125 via one of the wired network, the wireless network, the cloud-based network, and/or the like. The orchestrator 125 may receive the response to the alert from the core network 130. As shown at step 19, the orchestrator 125 may provide the response to the alert to the CMS 120 via one of the wired network, the wireless network, the cloud-based network, and/or the like. The CMS 120 may receive the response to the alert from the orchestrator 125. As shown at step 20, the CMS 120 may provide the response to the alert to the EDF 145 via the DFOS control and management interface. The EDF 145 may receive the response to the alert from the CMS 120.

In this way, the sensor device (e.g., the DFOS device 105) utilizes distributed fiber optic sensing to detect risks to fibers. For example, when a risk to a fiber cable is detected by the sensor device, the sensor device may provide notice of the risk to devices associated with other networks (e.g., a user device associated with a RAN and a core network). Furthermore, the devices associated with the other networks may request that the sensor device monitor a fiber cable. Thus, the sensor device may conserve computing resources, networking resources, and/or other resources that would have otherwise been consumed by failing to notify devices associated with other network about DFOS detected risks to fiber cables, failing to enable the devices associated with the other networks to request DFOS monitoring of fiber cables, failing to support new services, such as determination of cable locations, cable cut prevention, perimeter intrusion detection, and/or other sensing-based services for fibers, and/or the like.

In some implementations, the data processing function and the Rx-DSP of the EDF 145 may utilize a machine learning model to determine whether an event has been detected. For example, the Rx-DSP may receive feedback optical signals based on a plurality of optical signals provided to the optical fiber network, and may process the feedback optical signals, with a machine learning model, to train the model to determine thresholds associated with detecting vibration events in the optical fiber network. The Rx-DSP may generate an event detection table that includes the thresholds. The trained machine learning model may then be used to detect vibration events more accurately. The EDF 145 may modify parameters of the Tx-DSP based on the thresholds.

As indicated above, FIGS. 1A-1H are provided as an example. Other examples may differ from what is described with regard to FIGS. 1A-1H. The number and arrangement of devices shown in FIGS. 1A-1H are provided as an example. In practice, there may be additional devices, fewer devices, different devices, or differently arranged devices than those shown in FIGS. 1A-1H. Furthermore, two or more devices shown in FIGS. 1A-1H may be implemented within a single device, or a single device shown in FIGS. 1A-1H may be implemented as multiple, distributed devices. Additionally, or alternatively, a set of devices (e.g., one or more devices) shown in FIGS. 1A-1H may perform one or more functions described as being performed by another set of devices shown in FIGS. 1A-1H.

Figure 2:
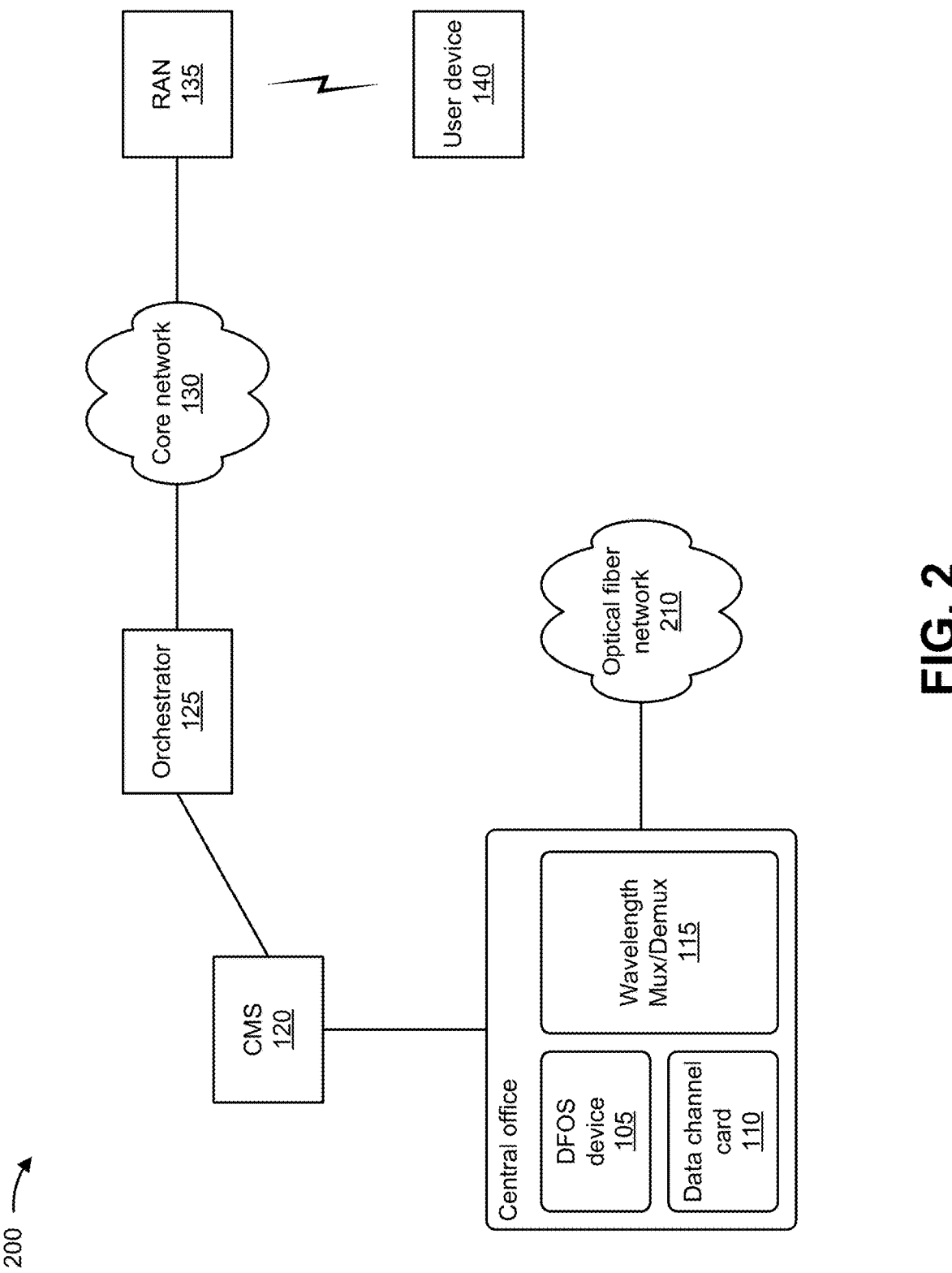
FIG. 2 is a diagram of an example environment in which systems and/or methods described herein may be implemented.

FIG. 2 is a diagram of an example environment 200 in which systems and/or methods described herein may be implemented. As shown in FIG. 2, the environment 200 may include the central office (e.g., with the DFOS device 105, the data channel card 110, and the wavelength multiplexer/demultiplexer 115), an optical fiber network 210, the CMS 120, the orchestrator 125, the core network 130, the RAN 135, and the user device 140. Devices and/or elements of the environment 200 may interconnect via wired connections and/or wireless connections.

The central office may include one or more devices capable of receiving, generating, storing, processing, and/or providing information in a manner described herein. For example, in the context of telecommunications, the central office is a device which begins or ends a telecommunications link and is a point at which a signal enters or leaves a network, such as the optical fiber network 210. In some implementations, the central office may include a network device, such as a label switching router (LSR), a label edge router (LER), an ingress router, an egress router, a provider router (e.g., a provider edge router or a provider core router), a virtual router, or another type of router. Additionally, or alternatively, the central office may include a gateway, a switch, a firewall, a hub, a bridge, a reverse proxy, a server (e.g., a proxy server, a cloud server, or a data center server), a load balancer, and/or a similar device. In some implementations, the central office may be a physical device implemented within a housing, such as a chassis. In some implementations, a group of central offices may be a group of data center nodes that are used to route traffic flow through a network.

The DFOS device 105 may include one or more devices capable of receiving, generating, storing, processing, and/or providing information, such as information described herein. For example, the DFOS device 105 may include optical components, including a distributed fiber optic sensor device—such as a distributed fiber optic acoustic sensor device that uses a fiber cable to provide distributed strain sensing, where the fiber cable is a sensing element and vibration detection and measurements are made using an optoelectronic device. The distributed fiber optic acoustic sensor device may include a Rayleigh scattering-based distributed fiber optic acoustic sensor device. The DFOS device 105 may further include an optical reflectometry device, such as an optical time-domain reflectometry (OTDR) device. The optical reflectometry device may be used with the distributed optical sensor device to perform acoustical sensing of vibrations applied to and experienced by a fiber optic cable. The DFOS device 105 may also include or be associated with a processing system, such as a laptop computer, a tablet computer, a desktop computer, a server, a handheld computer, or a similar type of device, that determines vibration events and fiber cable distances to detected vibrations.

The data channel card 110 may include a device or a component that provides multiple data channels connected to the wavelength multiplexer/demultiplexer 115. The data channel card may convert digital data into optical data signals, and may provide the optical data signals to the multiplexer/demultiplexer 115 via the multiple data channels. The data channel card may receive optical data signals from the wavelength multiplexer/demultiplexer 115, and may convert the optical data signals into digital data.

The wavelength multiplexer/demultiplexer 115 may include a device that increases bandwidth over fiber optic networks. A multiplexer portion of the wavelength multiplexer/demultiplexer 115 may combine several data signals together for transporting over a single fiber. In some implementations, the multiplexer portion may filter and combine multiple wavelengths onto a single output port for transmission through a fiber. A demultiplexer portion of the wavelength multiplexer/demultiplexer 115 may filter and separate signals received together and may provide each data channel to an optical receiver (e.g., the DFOS device 105 and/or the data channel card 110). In some implementations, the demultiplexer portion may separate combined wavelengths received from a fiber, and may provide the signals modulated onto the separated wavelengths to the DFOS device 105 in the case of the sensing channel and/or to the data channel card 110 in the case of the data channels.

The CMS 120 may include one or more devices capable of receiving, generating, storing, processing, providing, and/or routing information, as described elsewhere herein. The CMS 120 may include a communication device and/or a computing device. For example, the CMS 120 may include a server, such as an application server, a client server, a web server, a database server, a host server, a proxy server, a virtual server (e.g., executing on computing hardware), or a server in a cloud computing system. In some implementations, the CMS 120 may include computing hardware used in a cloud computing environment.

The orchestrator 125 may include one or more devices capable of receiving, generating, storing, processing, providing, and/or routing information, as described elsewhere herein. The orchestrator 125 may include a communication device and/or a computing device. For example, the orchestrator 125 may include a server, such as an application server, a client server, a web server, a database server, a host server, a proxy server, a virtual server (e.g., executing on computing hardware), or a server in a cloud computing system. In some implementations, the orchestrator 125 may include computing hardware used in a cloud computing environment.

In some implementations, the core network 130 may include an example functional architecture in which systems and/or methods described herein may be implemented. For example, the core network 130 may include an example architecture of a fifth generation (5G) core network included in a 5G wireless telecommunications system. While the example of the core network 130 may be an example of a service-based architecture, in some implementations, the core network 130 may be implemented as a reference-point architecture and/or a fourth generation (4G) core network, among other examples. The core network 130 may include a number of functional elements. The functional elements may include, for example, a network slice selection function (NSSF), a network exposure function (NEF), an authentication server function (AUSF), a unified data management (UDM) component, a policy control function (PCF), an application function (AF), an access and mobility management function (AMF), a session management function (SMF), a user plane function (UPF), and/or the like. These functional elements may be communicatively connected via a message bus. Each of the functional elements may be implemented on one or more devices associated with a wireless telecommunications system. In some implementations, one or more of the functional elements may be implemented on physical devices, such as an access point, a base station, and/or a gateway. In some implementations, one or more of the functional elements may be implemented on a computing device of a cloud computing environment.

The RAN 135 may support, for example, a cellular radio access technology (RAT). The RAN 135 may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for the user device 140. The RAN 135 may transfer traffic between the user device 140 (e.g., using a cellular RAT), one or more base stations (e.g., using a wireless interface or a backhaul interface, such as a wired backhaul interface), and/or the core network 130. The RAN 135 may provide one or more cells that cover geographic areas.

In some implementations, the RAN 135 may perform scheduling and/or resource management for the user device 140 covered by the RAN 135 (e.g., a user device 140 covered by a cell provided by the RAN 135). In some implementations, the RAN 135 may be controlled or coordinated by a network controller, which may perform load balancing, network-level configuration, and/or other operations. The network controller may communicate with the RAN 135 via a wireless or wireline backhaul. In some implementations, the RAN 135 may include a network controller, a self-organizing network (SON) module or component, or a similar module or component. In other words, the RAN 135 may perform network control, scheduling, and/or network management functions (e.g., for uplink, downlink, and/or sidelink communications of the user device 140 covered by the RAN 135).

The user device 140 includes one or more devices capable of receiving, generating, storing, processing, and/or providing information, such as information described herein. For example, the user device 140 may include a mobile phone (e.g., a smart phone or a radiotelephone), a laptop computer, a tablet computer, a desktop computer, a handheld computer, a gaming device, a wearable communication device (e.g., a smart watch or a pair of smart glasses), a mobile hotspot device, a fixed wireless access device, customer premises equipment, an autonomous vehicle, or a similar type of device.

The optical fiber network 210 may include a network of cables containing bundles of glass or plastic strands called optical fibers or fiber cables, which carry data that has been transformed into light. The light may be transmitted along the optical fiber network 210 by a laser, after having been converted by a computer into digital data signals. The optical fiber network 210 may enable communication among one or devices of the environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
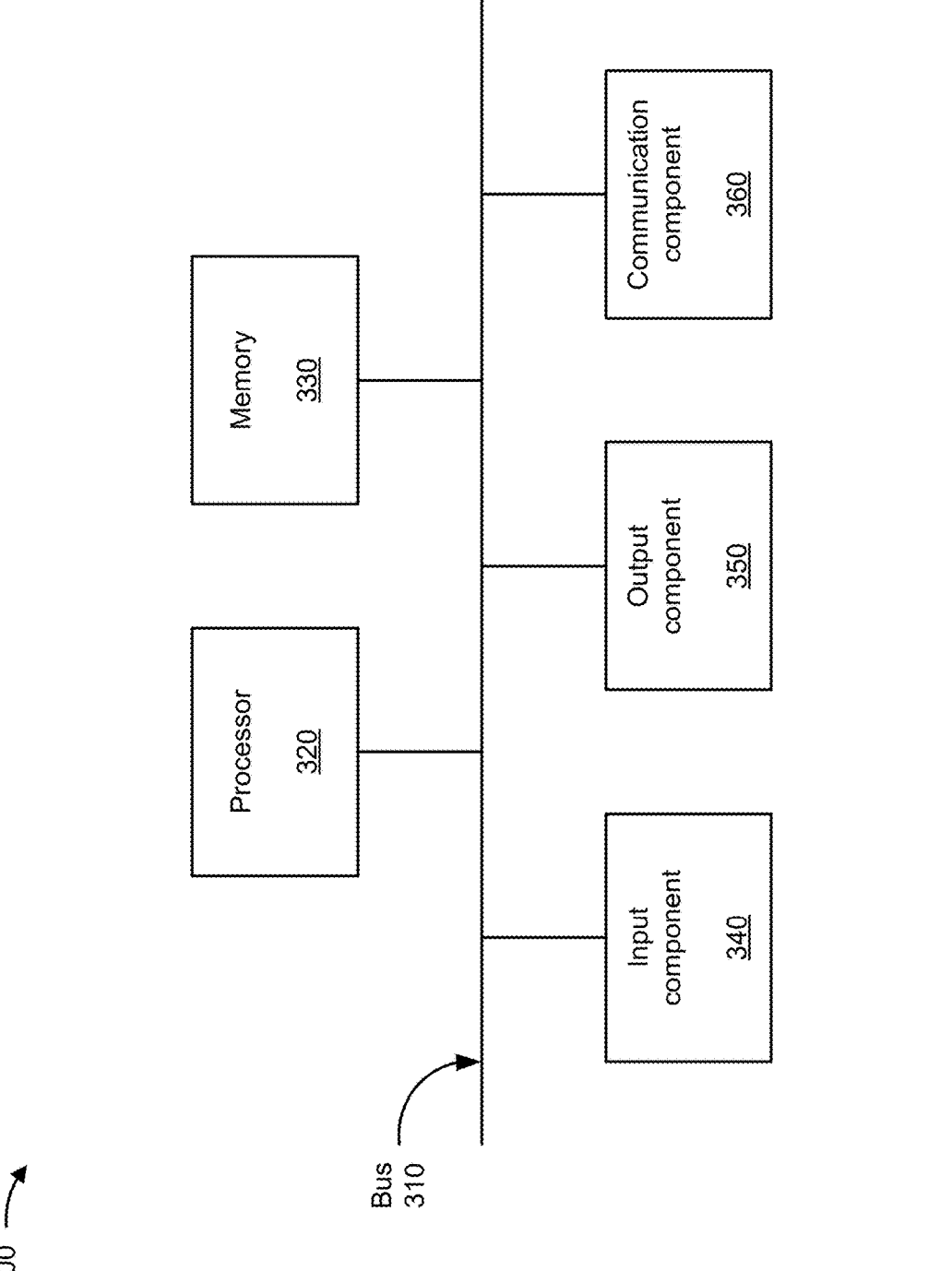
FIG. 3 is a diagram of example components of one or more devices of FIG. 2.

FIG. 3 is a diagram of example components of a device 300, which may correspond to the DFOS device 105, the data channel card 110, the wavelength multiplexer/demultiplexer 115, the CMS 120, the orchestrator 125, the RAN 135, and/or the user device 140. In some implementations, the DFOS device 105, the data channel card 110, the wavelength multiplexer/demultiplexer 115, the CMS 120, the orchestrator 125, the RAN 135, and/or the user device 140 may include one or more devices 300 and/or one or more components of the device 300. As shown in FIG. 3, the device 300 may include a bus 310, a processor 320, a memory 330, an input component 340, an output component 350, and a communication component 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication component 360 enables the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

FIG. 4 depicts a flowchart of an example process 400 for utilizing distributed fiber optic sensing to detect risks to fibers. In some implementations, one or more process blocks of FIG. 4 may be performed by a device (e.g., the DFOS device 105). In some implementations, one or more process blocks of FIG. 4 may be performed by another device or a group of devices separate from or including the device, such as a CMS (e.g., the CMS 120) and/or an orchestrator (e.g., the orchestrator 125). Additionally, or alternatively, one or more process blocks of FIG. 4 may be performed by one or more components of the device 300, such as the processor 320, the memory 330, the input component 340, the output component 350, and/or the communication component 360.

As shown in FIG. 4, process 400 may include receiving, at a monitoring system and from a user device, a request to monitor a fiber cable (block 410). For example, a monitoring system may receive, from a user device, a request to monitor a fiber cable, as described above. In some implementations, the fiber cable includes one of a single fiber cable or a fiber cable pair. In some implementations, the request to monitor the fiber cable includes a geographic location, and wherein the monitoring system determines the fiber cable based on the geographic location.

As further shown in FIG. 4, process 400 may include sending an instruction from the monitoring system to a device serving the fiber cable to begin a monitoring function (block 420). For example, the device may send an instruction from the monitoring system to a device serving the fiber cable to begin a monitoring function, as described above.

As further shown in FIG. 4, process 400 may include providing a first optical signal to the fiber cable (block 430). For example, the device may provide a first optical signal to the fiber cable, as described above. In some implementations, providing the first optical signal to the fiber cable includes providing a sensing signal over a wavelength of the fiber cable, and wherein receiving the second optical signal includes receiving the second optical signal over the wavelength.

As further shown in FIG. 4, process 400 may include receiving, from the fiber cable, a second optical signal based on the first optical signal (block 440). For example, the device may receive, from the fiber cable, a second optical signal based on the first optical signal, as described above.

As further shown in FIG. 4, process 400 may include detecting a risk to the fiber cable based on the second optical signal (block 450). For example, the device may detect a risk to the fiber cable based on the second optical signal, as described above. In some implementations, detecting the risk to the fiber cable based on the second optical signal includes comparing the second optical signal with a risk assessment table, and detecting the risk to the fiber cable based on comparing the second optical signal with the risk assessment table. In some implementations, the risk assessment table includes one or more risk thresholds associated with risk to the fiber cable and detecting the risk to the fiber cable based on comparing the second optical signal with the risk assessment table includes comparing the second optical signal to the one or more risk thresholds.

As further shown in FIG. 4, process 400 may include sending, to the monitoring system, an alert about the risk to the fiber cable (block 460). For example, the device may send, to the monitoring system, an alert about the risk to the fiber cable, as described above.

As further shown in FIG. 4, process 400 may include causing the alert to be provided to the user device (block 470). For example, the monitoring system may cause the alert to be provided to the user device, as described above. In some implementations, the request from the user device includes an identifier of one or more user devices to receive alerts regarding the monitoring of the fiber cable, and wherein causing the alert to be provided to the user device includes causing the alert to be sent to the one or more user devices.

In some implementations, process 400 includes receiving, at the monitoring system and from the user device, a request to stop monitoring the fiber cable, and sending an instruction from the monitoring system and to the device serving the fiber cable to end the monitoring function.

In some implementations, the monitoring system determines the fiber cable and a different fiber cable than the fiber cable based on the geographic location, and the process 400 includes sending an instruction from the monitoring system to a device serving the different fiber cable to begin a monitoring function, providing a third optical signal to the different fiber cable, receiving, from the different fiber cable, a fourth optical signal based on the third optical signal, detecting a risk to the different fiber cable based on the fourth optical signal, sending, to the monitoring system, an alert about the risk to the different fiber cable, and causing the alert to be provided to the user device.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
receiving, at a monitoring system and from a user device associated with a cellular network, a request to monitor a fiber cable, wherein the request includes a geographic location associated with a potential risk event;
sending, in response to receiving the request and based on determining the fiber cable based on the geographic location, an instruction from the monitoring system to a device serving the fiber cable to begin a monitoring function;
providing, by the device, a first optical signal to the fiber cable;
receiving, by the device and from the fiber cable, a second optical signal based on the first optical signal;
detecting, by the device, a risk to the fiber cable based on the second optical signal;
sending, by the device and to the monitoring system, an alert about the risk to the fiber cable;
causing, by the monitoring system and via the cellular network, the alert to be provided to the user device; and

causing, by the monitoring system, acknowledgement of the alert from the user device to be provided to the device.

2. The method of claim 1, wherein the request from the user device includes an identifier of one or more user devices to receive alerts regarding the monitoring of the fiber cable; and
wherein causing the alert to be provided to the user device includes causing the alert to be sent to the one or more user devices.

3. The method of claim 1, wherein providing the first optical signal to the fiber cable includes providing a sensing signal over a wavelength of the fiber cable, and wherein receiving the second optical signal includes receiving the second optical signal over the wavelength.

4. The method of claim 1, wherein detecting the risk to the fiber cable based on the second optical signal comprises:
comparing the second optical signal with a risk assessment table; and
detecting the risk to the fiber cable based on comparing the second optical signal with the risk assessment table.

5. The method of claim 4, wherein the risk assessment table includes one or more risk thresholds associated with risk to the fiber cable and detecting the risk to the fiber cable based on comparing the second optical signal with the risk assessment table includes comparing the second optical signal to the one or more risk thresholds.

6. The method of claim 1, wherein the fiber cable includes one of a single fiber cable or a fiber cable pair.

7. The method of claim 1, further comprising: receiving, at the monitoring system and from the user device, a request to stop monitoring the fiber cable; and
sending an instruction from the monitoring system and to the device to end the monitoring function.

8. The method of claim 1, wherein the monitoring system determines the fiber cable and a different fiber cable than the fiber cable based on the geographic location, and the method further comprises:
sending an instruction from the monitoring system to a device serving the different fiber cable to begin a monitoring function;
providing, by the device serving the different fiber cable, a third optical signal to the different fiber cable;
receiving, by the device serving the different fiber cable and from the different fiber cable, a fourth optical signal based on the third optical signal;
detecting, by the device serving the different fiber cable, a risk to the different fiber cable based on the fourth optical signal;
sending, by the device serving the different fiber cable and to the monitoring system, an alert about the risk to the different fiber cable; and
causing, by the monitoring system, the alert to be provided to the user device.

9. The method of claim 1, wherein the request to monitor the fiber cable is generated by a user.

10. The method of claim 1, further comprising: determining the fiber cable prior to detecting the risk.

11. A system, comprising:
one or more memories; and
one or more processors, configured to:
receive, at a monitoring system connected to a cellular network and from a first user device associated with the cellular network, a first request to monitor a first fiber cable, wherein the first request includes a geographic location associated with a potential risk event;

end, by the monitoring system, to a first fiber sensing device connected to the monitoring system, in response to receiving the first request, and based on determining the first fiber cable based on the geographic location, an instruction to begin a monitoring function for the first fiber cable;

provide by the fiber sensing device, a first optical signal to the first fiber cable;

receive, by the fiber sensing device and from the first fiber cable, a second optical signal, based on the first optical signal;

detect, by the fiber sensing device, a risk to the first fiber cable based on the second optical signal;

send, by the fiber sensing device, to the monitoring system, and via the cellular network, an alert about the risk to the first fiber cable;

cause, by the monitoring system and via the cellular network, the alert to be provided to the first user device; and cause, by the monitoring system, acknowledgement of the alert from the first user device to be provided to the fiber sensing device.

12. The system of claim 11, wherein the first request from the first user device includes an identifier of one or more user devices to receive alerts regarding the monitoring of the first fiber cable; and wherein the monitoring system causes the alert to be sent to the one or more user devices.

13. The system of claim 11, wherein providing the first optical signal to the first fiber cable includes providing a sensing signal over a wavelength of the fiber cable, and wherein receiving the second optical signal includes receiving the second optical signal over the wavelength.

14. The system of claim 11, wherein, when detecting the risk to the first fiber cable based on the second optical signal, the first fiber sensing device is configured to: compare the second optical signal with a risk assessment table; and detect the risk to the first fiber cable based on comparing the second optical signal with the risk assessment table.

15. The system of claim 14, wherein the risk assessment table includes one or more risk thresholds associated with risk to the first fiber cable, and, when detecting the risk to the first fiber cable based on comparing the second optical signal with the risk assessment table, the first fiber sensing device is configured to:

compare the second optical signal to the one or more risk thresholds.

16. The system of claim 11, wherein the first fiber cable includes one of a single fiber cable or a fiber cable pair.

17. The system of claim 11, wherein the monitoring system receives from the first user device a request to stop monitoring the first fiber cable, and the monitoring system sends an instruction to the first fiber sensing device to end the monitoring function for the first fiber cable.

18. The system of claim 11, further comprising a second fiber sensing device connected to the monitoring system to communicate messages with the monitoring system and connected to a second fiber cable; and wherein the monitoring system receives, from a second user device and via the cellular network, a second request to monitor the second fiber cable, and sends an instruction to begin a monitoring function for the second fiber cable.

19. The system of claim 18, wherein the second user device and the first user device are the same user device.

20. The system of claim 19, wherein the first request and the second request are part of a same message from the same user device, and wherein the message includes the geographic location, and wherein the monitoring system determines the first fiber cable and the second fiber cable from the geographic location.

* * * * *